United States Patent
Adhikary et al.

(10) Patent No.: US 10,333,754 B2
(45) Date of Patent: Jun. 25, 2019

(54) REFERENCE SIGNAL GENERATION IN A WIRELESS COMMUNICATION SYSTEM

(71) Applicant: Telefonaktiebolaget LM Ericsson (publ), Stockholm (SE)

(72) Inventors: Ansuman Adhikary, Santa Clara, CA (US); Yufei Blankenship, Kildeer, IL (US); Asbjörn Grövlen, Stockholm (SE); Xingqin Lin, San Jose, CA (US); Vidit Saxena, Spånga (SE); Yutao Sui, Solna (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/540,591

(22) PCT Filed: Apr. 5, 2017

(86) PCT No.: PCT/SE2017/050340
§ 371 (c)(1),
(2) Date: Jun. 29, 2017

(87) PCT Pub. No.: WO2017/176204
PCT Pub. Date: Oct. 12, 2017

(65) Prior Publication Data
US 2018/0115446 A1     Apr. 26, 2018

Related U.S. Application Data

(60) Provisional application No. 62/318,601, filed on Apr. 5, 2016.

(51) Int. Cl.
*H04L 27/26* (2006.01)
*H04L 25/02* (2006.01)
(Continued)

(52) U.S. Cl.
CPC ...... *H04L 27/2613* (2013.01); *H04L 25/0226* (2013.01); *H04L 5/0048* (2013.01); *H04L 27/18* (2013.01)

(58) Field of Classification Search
CPC . H04L 27/2613; H04L 5/0055; H04L 5/0048; H04W 72/042; H04W 72/0413; H04W 72/0446
See application file for complete search history.

(56) References Cited

U.S. PATENT DOCUMENTS

2016/0088594 A1     3/2016 Xiong et al.

OTHER PUBLICATIONS

"NB-IoT UL Reference Signals," 3GPP TSG-RAN WG1 NB-IoT Ad-Hoc Meeting, Mar. 2016 (hereinafter "3GPP") (Year: 2016).*

(Continued)

*Primary Examiner* — Jamal Javaid
(74) *Attorney, Agent, or Firm* — Murphy, Bilak & Homiller, PLLC

(57) ABSTRACT

A user equipment (12) is configured to determine a length-6 phase coefficient sequence that is one of multiple unique length-6 phase coefficient sequences in a defined set (18). The length-6 phase coefficient sequences in the defined set (18) include at least: $\{1, 1, 1, 1, 3, -3\}$ and $\{-3, 3, -3, 1, 1, -3\}$; or $\{-1, -1, -1, 3, -3, -1\}$ and either $\{3, -3, 3, -1, 3, 3\}$ or $\{1, 3, 1, -1, -1, 3\}$. The user equipment (12) is also configured to generate a quadrature phase shift keying, QPSK-based sequence that comprises a sequence of QPSK symbols whose respective phases are based on the determined phase coefficient sequence. The user equipment (12) is further configured to generate a reference signal (16) using the generated QPSK-based sequence, and transmit the generated reference signal (16) to a network node (14) in a wireless communication system (10).

36 Claims, 11 Drawing Sheets

(51) Int. Cl.
*H04L 5/00* (2006.01)
*H04L 27/18* (2006.01)

(56) References Cited

OTHER PUBLICATIONS

Nokia Networks et al., "On UL DMRS design for NB-IoT", 3GPP TSG RAN1 NP-IoT Ad-Hoc meeting, Mar. 22-24, 2016, pp. 1-9, Sophia Antipolis, France, R1-161851.
Qualcomm Incorporated, "Uplink narrowband DM-RS", 3GPP TSG RAN WG1 NB-IoT Ad-Hoc Meeting, Mar. 22-24, 2016, pp. 1-8, Sophia Antipolis, France, R1-161942.
Lenovo, "Uplink DMRS Sequence Design for NB-IoT", 3GPP TSG RAN WG1 Meeting #84bis, Apr. 11-15, 2016, pp. 1-6, R1-162730.
ETRI, "Uplink DMRS design for NB-IoT", 3GPP TSG RAN WG1 NB-IoT Ad-Hoc Meeting, Feb. 18-20, 2016, pp. 1-3, R1-160125.
WI Rapporteur (Ericsson), "RAN1 agreements for Rel-13 NB-IoT", 3GPP TSG-RAN WG1 Meeting #84, Feb. 15-19, 2016, pp. 1-19, R1-16xxxx.
Ericsson, "NB-IoT—Design Considerations for UL reference signals", 3GPP TSG-RAN1 NB-IOT Ad Hoc, Jan. 18-20, 2016, pp. 1-3, R1-160092.
Qualcomm Europe, "Computer Generated Sequence Comparison", 3GPP TSG RAN1 #50bis, Oct. 8-12, 2007, pp. 1-13, R1-073910.
Huawei et al., "Revised Work Item: Narrowband IoT (NB-IoT)", 3GPP TSG RAN Meeting #70, Dec. 7-10, 2015, pp. 1-11, RP-152284.
3rd Generation Partnership Project, "Technical Specification Group Radio Access Network; Evolved Universal Terrestrial Radio Access (E-UTRA); Physical channels and modulation (Release 13)", 3GPP TS 36.211 V13.0.0, Dec. 2015, pp. 1-141.
Lenovo, "Remaining issues of uplink DMRS for NB-IoT", 3GPP TSG RAN WG1 NB-IoT Ad-Hoc Meeting, Mar. 22-24, 2016, Sophia Antipolis, France, R1-161979.
Ericsson, "NB-IoT—UL Reference signals", 3GPP TSG RAN WG1 NB-IoT Ad-Hoc Meeting, Mar. 22-24, 2016, pp. 1-5, Sophia Antipolis, France, R1-161833.
Ericsson, "NB-IoT—UL Reference signals", 3GPP TSG-RAN WG1 Meeting #84bis, Apr. 11-15, 2016, pp. 1-8, Busan, Korea, R1-162777.
"NB-IoT—UL Reference signals", 3GPP TSG-RAN WG1 Meeting #84bis; R1-162777; Busan, Korea, Apr. 11-15, 2016, pp. 1-8.
"NB-IoT—UL Reference signals", 3GPP TSG RAN WG1 NB-IoT Ad-Hoc Meeting; R1-161833; Sophia Antipolis, France, Mar. 22-24, 2016, pp. 1-5.
"Uplink DMRS Sequence Design for NB-IoT", 3GPP TSG RAN WG1 Meeting #84bis; R1-162730; Busan, Korea, Apr. 11-15, 2016, pp. 1-6.
"Uplink Narrowband DM-RS", 3GPP TSG RAN WG1 NB-IoT Ad-Hoc Meeting; R1-161942; Sophia Antipolis, France, Mar. 22-24, 2016, pp. 1-7.

\* cited by examiner

| DEFINED SET 18 | | | | | |
|---|---|---|---|---|---|
| 1 | 1 | 1 | 3 | -3 | ... |
| 3 | 3 | -3 | 1 | 1 | -3 |

*FIG. 2A*

| DEFINED SET 18 | | | | | |
|---|---|---|---|---|---|
| -1 | -1 | 3 | -3 | -1 | ... |
| 3 | -3 | 3 | -1 | 3 | 3 |

*FIG. 2B*

| DEFINED SET 18 | | | | | |
|---|---|---|---|---|---|
| -1 | -1 | -1 | 3 | -3 | -1 | ... |
| 1 | 3 | 1 | -1 | -1 | 3 |

*FIG. 2C*

| DEFINED SET 18 |||||| 
|---|---|---|---|---|---|
| 1 | 1 | 1 | 1 | 3 | -3 |
| -3 | 3 | -3 | 1 | 1 | -3 |
| 1 | 1 | 1 | 1 | 3 | -3 |
| -3 | 3 | -3 | 1 | 1 | -3 |
| 1 | 1 | 1 | 1 | 3 | -3 |
| -3 | 3 | -3 | 1 | 1 | -3 |
| 1 | 1 | 1 | 1 | 3 | -3 |
| -3 | 3 | -3 | 1 | 1 | -3 |
| 1 | 1 | 1 | 1 | 3 | -3 |
| -3 | 3 | -3 | 1 | 1 | -3 |
| 1 | 1 | 1 | 1 | 3 | -3 |
| -3 | 3 | -3 | 1 | 1 | -3 |
| 1 | 1 | 1 | 1 | 3 | -3 |
| -3 | 3 | -3 | 1 | 1 | -3 |
| 1 | 1 | 1 | 1 | 3 | -3 |
| -3 | 3 | -3 | 1 | 1 | -3 |

DETERMINE A LENGTH-6 PHASE COEFFICIENT SEQUENCE THAT IS ONE OF MULTIPLE UNIQUE LENGTH-6 PHASE COEFFICIENT SEQUENCES IN A DEFINED SET, WHEREIN THE LENGTH-6 PHASE COEFFICIENT SEQUENCES IN THE DEFINED SET INCLUDE AT LEAST:
{1, 1, 1, 1, 3, -3} AND {-3, 3, -3, 1, 1, -3}; OR
{-1, -1, -1, 3, -3, -1} AND EITHER {3, -3, 3, -1, 3, 3} OR {1, 3, 1, -1, -1, 3};
210

RECEIVE, FROM A USER EQUIPMENT, A REFERENCE SIGNAL GENERATED BASED ON A QUADRATURE PHASE SHIFT KEYING (QPSK)-BASED SEQUENCE THAT COMPRISES A SEQUENCE OF QPSK SYMBOLS WHOSE RESPECTIVE PHASES ARE BASED ON THE DETERMINED PHASE COEFFICIENT SEQUENCE
220

DETERMINE A LENGTH-6 PHASE COEFFICIENT SEQUENCE THAT IS ONE OF N UNIQUE LENGTH-6 PHASE COEFFICIENT SEQUENCES IN A DEFINED SET, OR DETERMINING A LENGTH-3 PHASE COEFFICIENT SEQUENCE THAT IS A TRUNCATED VERSION OF ONE OF THE N UNIQUE LENGTH-6 PHASE COEFFICIENT SEQUENCES IN THE DEFINED SET, WHEREIN N UNIQUE LENGTH-3 PHASE COEFFICIENT SEQUENCES ARE FORMABLE AS TRUNCATED VERSIONS OF THE N UNIQUE LENGTH-6 PHASE COEFFICIENT SEQUENCES, WHEREIN THE N UNIQUE LENGTH-3 PHASE COEFFICIENT SEQUENCES INCLUDE AT LEAST {1, 1, 1} AND EITHER {-3, 3, -3}, {-3, -1, -3}, OR {-1, -3, -1}, OR NEGATIVE VERSIONS THEREOF
310

↓

GENERATE A QUADRATURE PHASE SHIFT KEYING (QPSK)-BASED SEQUENCE THAT COMPRISES A SEQUENCE OF QPSK SYMBOLS WHOSE RESPECTIVE PHASES ARE BASED ON THE DETERMINED PHASE COEFFICIENT SEQUENCE
320

↓

GENERATE A REFERENCE SIGNAL USING THE GENERATED QPSK-BASED SEQUENCE
330

↓

TRANSMIT THE GENERATED REFERENCE SIGNAL
340

DETERMINE A LENGTH-6 PHASE COEFFICIENT SEQUENCE THAT IS ONE OF N UNIQUE LENGTH-6 PHASE COEFFICIENT SEQUENCES IN A DEFINED SET, OR DETERMINING A LENGTH-3 PHASE COEFFICIENT SEQUENCE THAT IS A TRUNCATED VERSION OF ONE OF THE N UNIQUE LENGTH-6 PHASE COEFFICIENT SEQUENCES IN THE DEFINED SET, WHEREIN N UNIQUE LENGTH-3 PHASE COEFFICIENT SEQUENCES ARE FORMABLE AS TRUNCATED VERSIONS OF THE N UNIQUE LENGTH-6 PHASE COEFFICIENT SEQUENCES, WHEREIN THE N UNIQUE LENGTH-3 PHASE COEFFICIENT SEQUENCES INCLUDE AT LEAST {1, 1, 1} AND EITHER {-3, 3, -3}, {-3, -1, -3}, OR {-1, -3, -1}, OR NEGATIVE VERSIONS THEREOF
410

TRANSMIT INFORMATION INDICATING THE DETERMINED PHASE COEFFICIENT SEQUENCE AS BEING A SEQUENCE ON WHICH THE QPSK-BASED SEQUENCE IS TO BE GENERATED
420

*FIG. 6*

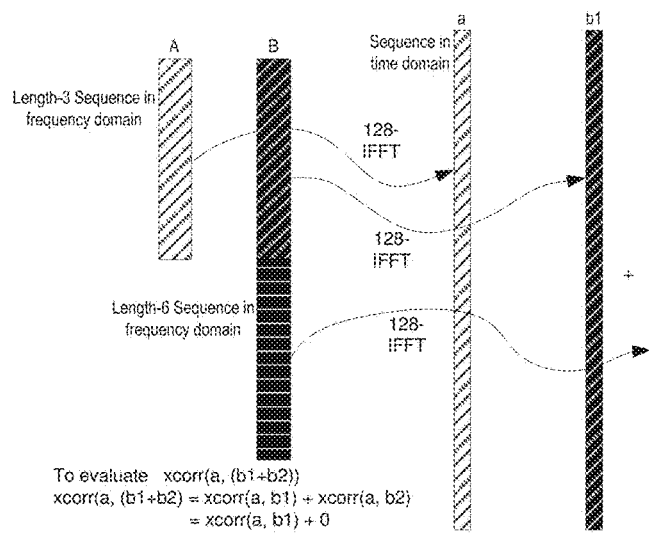
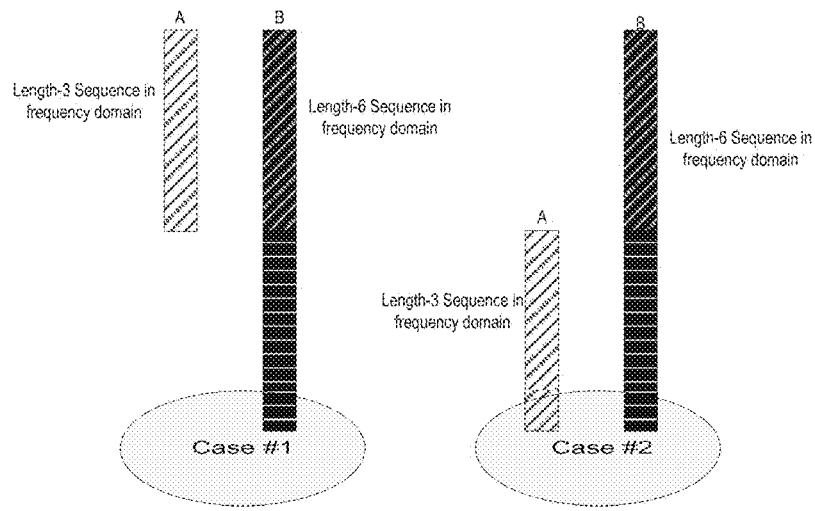
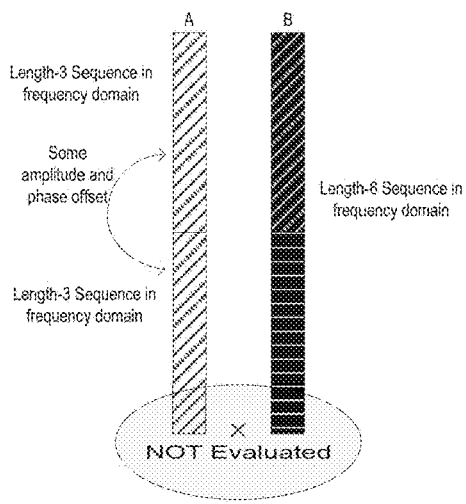
FIG. 9A

REFERENCE SIGNAL GENERATION IN A WIRELESS COMMUNICATION SYSTEM

RELATED APPLICATIONS

This application claims priority to U.S. Provisional patent Application Ser. No. 62/318,601 filed Apr. 5, 2016, the entire contents of which are incorporated herein by reference.

BACKGROUND

Cellular communication systems are currently being developed and improved for machine type communication (MTC). MTC is characterized by lower demands on data rates than for example mobile broadband, but with higher requirements on e.g. low cost device design, better coverage, and ability to operate for years on batteries without charging or replacing the batteries. Currently, 3GPP is standardizing a feature called Narrowband Internet of Things (NB-IoT) for satisfying all the requirements put forward by MTC type applications, while coexisting with the legacy Long Term Evolution (LTE) radio access technology. At 3GPP RAN #70 meeting, a new work item named Narrowband IoT (NB-IoT) was approved. See RP-152284, "New Work Item: Narrowband IoT (NB-IoT)," sources Huawei and HiSilicon, RAN #70. The objective is to specify a radio access for cellular internet of things that addresses improved indoor coverage, support for massive number of low throughput devices, low delay sensitivity, ultra-low device cost, low device power consumption and (optimized) network architecture.

For NB-IoT, three different operation modes are defined, i.e., standalone, guard-band, and in-band. In standalone mode, the NB-IoT system is operated in a dedicated frequency band, e.g., refarming one or more Global Systems for Mobile communication (GSM) channels. For in-band operation, the NB-IoT system can be placed inside the frequency bands used by the current LTE system, while in the guard-band mode, the NB-IoT system can be placed in the guard band used by the current LTE system. The NB-IoT has a system bandwidth of 180 kHz, i.e. substantially smaller than the LTE system bandwidth which is in the range from 1.4 MHz to 20 MHz.

For the NB-IoT system uplink, both single-tone and multi-tone operations are defined. For single-tone uplink, both 3.75 kHz and 15 kHz subcarrier spacings are supported. From RP-152284, it is stated "Single tone transmissions are supported. Two numerologies should be configurable by the network for single-tone transmission: 3.75 kHz and 15 kHz, A cyclic prefix is inserted. Frequency domain sinc pulse-shaping in the physical layer description. Multi-tone transmissions are supported, based on Single Carrier Frequency Division Multiple Access (SC-FDMA) with 15 kHz UL subcarrier spacing." In addition, for multi-tone uplink, the numbers of subcarriers that can be used are currently agreed to be 3, 6, and 12. See R1-16xxxx, RAN1 agreements for Rel-13 NB-IOT, source, WI rapporteur (Ericsson), 3GPP TSG-RAN WG1 Meeting #84, St. Julian's, Malta, Feb. 15-19, 2016. As the NB-IoT system bandwidth is 180 kHz, which is the same size as 1 physical resource block (PRB) in the current LTE system, there are at most 12 subcarriers.

For the case of 12 subcarriers allocated to an NB-IoT device for its uplink transmission, it can re-use the uplink reference symbols designed for LTE. But as the minimum resource allocation granularity of the LTE system is 1 PRB, there are no shorter reference symbol sequences than length 12 defined. Therefore, for NB-IoT devices that are allocated 3 or 6 subcarriers for their uplink transmission, there are no reference symbol sequences defined.

SUMMARY

According to some embodiments herein, a user equipment generates a reference signal using a sequence of quadrature phase shift keying (QPSK) symbols whose respective phases are based on one of multiple unique phase coefficient sequences in a defined set. This defined set includes at least some sequences such that, according to certain embodiments, the QPSK-based sequences formable from the phase coefficient sequences in the defined set advantageously have certain desired properties, e.g., a normalized maximum cross-correlation in the time domain less than or equal to 0.75. This may be the case even for sequences that have lengths less than 12, including for instance lengths of 3 or 6. In fact, one or more embodiments herein provide reference symbol sequences for NB-IoT user equipment that are allocated 3 and 6 subcarriers for uplink transmission.

More particularly, embodiments herein include a method implemented by a user equipment for transmitting a reference signal in a wireless communication system (e.g., NB-IoT system). The method includes determining a length-6 phase coefficient sequence that is one of multiple unique length-6 phase coefficient sequences in a defined set. The length-6 phase coefficient sequences in the defined set include at least: $\{1, 1, 1, 1, 3, -3\}$ and $\{-3, 3, -3, 1, 1, -3\}$; or $\{-1, -1, -1, 3, -3, -1\}$ and either $\{3, -3, 3, -1, 3, 3\}$ or $\{1, 3, 1, -1, -1, 3\}$. The method also includes generating a quadrature phase shift keying (QPSK)-based sequence that comprises a sequence of QPSK symbols whose respective phases are based on the determined phase coefficient sequence. The method further includes generating a reference signal using the generated QPSK-based sequence, and transmitting the generated reference signal to a network node in the wireless communication system.

Embodiments also include a method implemented by a network node in a wireless communication system. The method comprises determining a length-6 phase coefficient sequence that is one of multiple unique length-6 phase coefficient sequences in a defined set. The length-6 phase coefficient sequences in the defined set include at least $\{1, 1, 1, 1, 3, -3\}$ and $\{-3, 3, -3, 1, 1, -3\}$; or $\{-1, -1, -1, 3, -3, -1\}$ and either $\{3, -3, 3, -1, 3, 3\}$ or $\{1, 3, 1, -1, -1, 3\}$. The method also includes receiving, from a user equipment, a reference signal generated based on a quadrature phase shift keying (QPSK)-based sequence that comprises a sequence of QPSK symbols whose respective phases are based on the determined phase coefficient sequence.

In any of these embodiments, the length-6 QPSK-based sequences formable from the length-6 phase coefficient sequences in the defined set may have a normalized maximum pair-wise cross-correlation in the time domain less than or equal to 0.75.

In even more detail, the unique length-6 phase coefficient sequences in the defined set in some embodiments include: $\{1, 1, 1, 1, 3, -3\}$, $\{1, 1, -1, -3, -3, 3\}$, $\{1, 1, 3, 1, -3, 3\}$, $\{1, -1, -1, -1, 1, -3\}$, $\{1, -1, 3, -3, -1, -1\}$, $\{1, 3, 1, -1, -1, 3\}$, $\{1, -3, -3, 1, 3, 1\}$, $\{-1, -1, 1, -3, -3, -1\}$, $\{-1, -1, -1, 3, -3, -1\}$, $\{3, -1, 1, -3, -3, 3\}$, $\{3, -1, 3, -3, -1, 1\}$, $\{3, 3, -3, -3, -3, -1\}$, $\{3, -3, 3, -1, 3, 3\}$, $\{-3, 1, 3, 1, -3, -1\}$, $\{-3, 1, -3, 3, -3, -1\}$, and $\{-3, 3, -3, 1, 1, -3\}$.

Alternatively, the unique length-6 phase coefficient sequences in the defined set may include: $\{1, 1, 1, 1, 3, -3\}$, $\{1, 1, 3, 1, -3, 3\}$, $\{1, -1, -1, -1, 1, -3\}$, $\{1, -1, 3, -3, -1,$ −1}, {1, 3, 1, −1, −1, 3}, {1, −3, −3, 1, 3, 1}, {−1, −1, 1, −3, −3, −1}, {−1, −1, −1, 3, −3, −1}, {3, −1, 1, −3, −3, 3}, {3, −1, 3, −3, −1, 1}, {3, −3, 3, −1, 3, 3}, {−3, 1, 3, 1, −3, −1}, {−3, 1, −3, 3, −3, −1}, and {−3, 3, −3, 1, 1, −3}.

In other embodiments, the unique length-6 phase coefficient sequences in the defined set may include {1, 1, 1, 1, 3, −3} and {−3, 3, −3, 1, 1, −3}, and one or more of: {1, 1, −1, −3, −3, 3}, {1, 1, 3, 1, −3, 3}, {1, −1, −1, −1, 1, −3}, {1, −1, 3, −3, −1, −1}, {1, 3, 1, −1, −1, 3}, {1, −3, −3, 1, 3, 1}, {−1, −1, 1, −3, −3, −1}, {−1, −1, −1, 3, −3, −1}, {3, −1, 1, −3, −3, 3}, {3, −1, 3, −3, −1, 1}, {3, 3, −3, −3, −3, −1}, {3, −3, 3, −1, 3, 3}, {−3, 1, 3, 1, −3, −1}, and {−3, 1, −3, 3, −3, −1}.

In yet other embodiments, the unique length-6 phase coefficient sequences in the defined set may include {−1, −1, −1, 3, −3, −1} and {3, −3, 3, −1, 3, 3}, and one or more of: {1, 1, 1, 1, 3, −3}, {1, 1, −1, −3, −3, 3}, {1, 1, 3, 1, −3, 3}, {1, −1, −1, −1, 1, −3}, {1, −1, 3, −3, −1, −1}, {1, 3, 1, −1, −1, 3}, {1, −3, −3, 1, 3, 1}, {−1, −1, 1, −3, −3, −1}, {3, −1, 1, −3, −3, 3}, {3, −1, 3, −3, −1, 1}, {3, 3, −3, −3, −3, −1}, {−3, 1, 3, 1, −3, −1}, {−3, 1, −3, 3, −3, −1}, and {−3, 3, −3, 1, 1, −3}.

In still other embodiments, the unique length-6 phase coefficient sequences in the defined set may include {−1, −1, −1, 3, −3, −1} and {1, 3, 1, −1, −1, 3}, and one or more of {1, 1, −1, −3, −3, 3}, {1, 1, 3, 1, −3, 3}, {1, −1, −1, −1, 1, −3}, {1, −1, 3, −3, −1, −1}, {1, −3, −3, 1, 3, 1}, {−1, −1, 1, −3, −3, −1}, {3, −1, 1, −3, −3, 3}, {3, −1, 3, −3, −1, 1}, {3, 3, −3, −3, −3, −1}, {3, −3, 3, −1, 3, 3}, {−3, 1, 3, 1, −3, −1}, and {−3, 1, −3, 3, −3, −1}.

In any event, the QPSK-based sequence may comprises a sequence $\tilde{r}(n) = e^{j\varphi(n)\pi/4}$, n=0, 1, . . . , M, where φ(n) is the determined phase coefficient sequence and M is the length of the determined phase coefficient sequence.

In any of these embodiments, the reference signal may be a cyclic shift of the QPSK-based sequence.

Moreover, in some embodiments, information transmitted from the network node to the user equipment indicates the determined length-6 phase coefficient sequence as being a sequence on which the QPSK-based sequence is to be generated. The information may for instance comprise an index into a table at the user equipment, wherein the table specifies the defined set of unique length-6 phase coefficient sequences. Alternatively, the user equipment and/or the network node may determine the length-6 phase coefficient sequence based on a cell identity of a cell serving the user equipment. This may involve for instance calculating the modulus of the cell identity with a number of unique length-6 QPSK-based sequences in the defined set.

In any of these embodiments, the reference signal may be transmitted on six subcarriers.

In any of these embodiments, the reference signal may be a demodulation reference signal.

In any of these embodiments, the wireless communication system may be a narrowband Internet of Things (NB-IoT) system.

In some embodiments, the network node is a base station.

Embodiments herein also include corresponding apparatus, computer programs, and computer-readable mediums.

BRIEF DESCRIPTION OF THE DRAWINGS

FIGS. 2A-2D are different block diagrams of a defined set of length-6 phase coefficient sequences according to different embodiments.

FIG. 4 is a logic flow diagram of a method performed by a network node according to some embodiments.

FIG. 5 is a logic flow diagram of a method performed by a user equipment according to other embodiments.

FIG. 6 is a logic flow diagram of a method performed by a network node according to other embodiments.

FIG. 9A is a block diagram of different cases under which cross-correlation between DMRS sequences may be calculated according to some embodiments.

DETAILED DESCRIPTION

Figure 1:
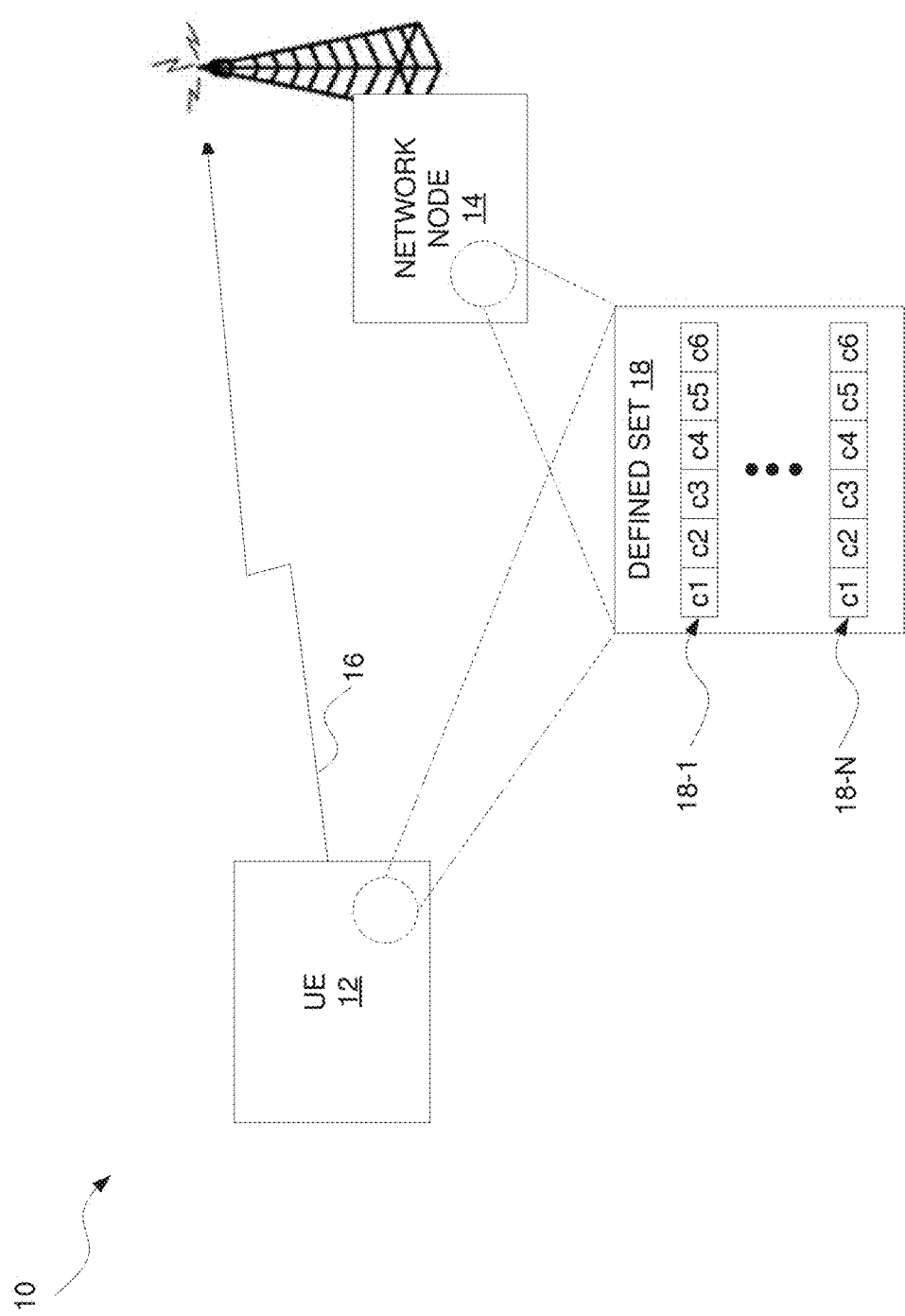
FIG. 1 is a block diagram of a wireless communication system that includes a user equipment and a network node according to some embodiments.

FIG. 1 illustrates a wireless communication system 10 (e.g., a narrowband Internet of Things, NB-IoT, system) according to some embodiments. The system 10 includes a user equipment (UE) 12 and a network node 14 (e.g., shown as a base station). The user equipment 12 is configured to transmit a reference signal 16 to the network node 14. The reference signal 16 may for instance be a demodulation reference signal (DMRS), e.g., associated with transmission of a physical uplink shared channel or a physical uplink control channel.

The user equipment 12 is configured to generate the reference signal 16 using a certain quadrature phase shift keying (QPSK)-based sequence. A QPSK-based sequence in this regard comprises a sequence of QPSK symbols. Each QPSK symbol in the sequence has a respective phase that is either π/4, −π/4, 3π/4, or −3π/4. The phase of each QPSK symbol may therefore be represented as φπ/4, where φ is a phase coefficient that is equal to either 1, −1, 3, or −3. Furthermore, the respective phases of the QPSK symbols in the QPSK-based sequence may be represented as a sequence of phase coefficients φ. That is, for a QPSK-based sequence that comprises a sequence of M QPSK symbols, the respective phases of those M QPSK symbols may be represented as a sequence of M phase coefficients.

As shown in FIG. 1, a set 18 of multiple unique phase coefficient sequences 18-1, . . . 18-N may be defined as possible sequences for the phases of QPSK symbols in a QPSK-based sequence. FIG. 1 in this regard shows that each phase coefficient sequence in the set 18 includes M=6 phase coefficients c1, c2, c3, c4, c5, and c6 such that each sequence has a length of M=6. With these length-6 phase coefficient sequences in the set 18 being unique, each phase coefficient sequence differs from the other phase coefficient sequences in the set 18 in at least one phase coefficient.

With this set 18 defined, the user equipment 12 determines a length-6 phase coefficient sequence from the set 18, and generates a QPSK-based sequence with QPSK symbols whose respective phases are based on that determined phase coefficient sequence. The user equipment 12 then generates the reference signal 16 using that QPSK-based sequence, e.g., by generating the reference signal 16 as a cyclic shift of the QPSK-based sequence. The user equipment 12 transmits the generated reference signal 16 to the network node 14, e.g., on M=6 subcarriers. The network node 14 in turn receives the reference signal 16.

FIGS. 2A-2C illustrate additional details of the defined set 18 of length-6 phase coefficient sequences according to different embodiments. As shown in FIG. 2A, the defined set 18 may include at least {1, 1, 1, 1, 3, −3} and {−3, 3, −3, 1, 1, −3} as phase coefficient sequences. Alternatively or additionally, FIG. 2B shows that the defined set 18 may include at least {−1, −1, −1, 3, −3, −1} and {3, −3, 3, −1, 3, 3} as phase coefficient sequences. Still further, FIG. 2C shows that the defined set 18 may alternatively or additionally include at least {−1, −1, −1, 3, −3, −1} and {1, 3, 1, −1, −1, 3} as phase coefficient sequences.

In some embodiments, defining the set 18 of length-6 phase coefficient sequences in these ways proves advantageous for realizing one or more desired properties. These one or more desired properties may include for instance relatively low pair-wise cross-correlation between the QPSK-based sequences that are formable from the phase coefficient sequences in the set 18. Indeed, in some embodiments, the QPSK-based sequences that are formable from phase coefficient sequences in the set 18 as defined in any of the above embodiments have a normalized maximum pair-wise cross-correlation in the time domain less than or equal to 0.75. Here, a normalized maximum pair-wise cross-correlation equaling 1 means two sequences are fully correlated in the time domain, which is not a preferable property. A low cross-correlation may for instance in turn minimize or reduce inter-cell interference where different QPSK-based sequences are used in different cells.

Alternatively or additionally, the one or more desired properties realizable from defining the set 18 as above may include that the set 18 has at least a certain size or number of phase coefficient sequences. For example, in some embodiments defining the set 18 to include at least the identified phase coefficient sequences allows the set 18 to have a size of up to N=16 length-6 sequences. The larger the number of sequences in the set 18, the larger the number of user equipment that can be supported for uplink transmission.

Furthermore, the one or more desired properties realizable from defining the set 18 as above may include that the QPSK-based sequences that are formable from phase coefficient sequences in the set 18 each have a relatively low cubic metric (CM) or peak-to-average power ratio (PAPR). Low CM or PAPR contributes for example to increased power efficiency at the user equipment 12.

Note that the set 18 of length-6 phase coefficient sequences according to some embodiments herein also includes other length-6 phase coefficient sequences. As shown in FIG. 2D, for example, the defined set 18 may include {1, 1, 1, 1, 3, −3}, {1, 1, −1, −3, −3, 3}, {1, 1, 3, 1, −3, 3}, {1, −1, −1, −1, 1, −3}, {1, −1, 3, −3, −1, −1}, {1, 3, 1, −1, −1, 3}, {1, −3, −3, 1, 3, 1}, {−1, −1, 1, −3, −3, −1}, {−1, −1, −1, 3, −3, −1}, {3, −1, 1, −3, −3, 3}, {3, −1, 3, −3, −1, 1}, {3, 3, −3, −3, −3, −1}, {3, −3, 3, −1, 3, 3}. {−3, 1, 3, 1, −3, −1}, {−3, 1, −3, 3, −3, −1}, and {−3, 3, −3, 1, 1, −3} as phase coefficient sequences. The phase coefficient sequences in the set 18 as shown for instance have a normalized maximum pair-wise cross-correlation in the time domain less than or equal to 0.75. And with 16 sequences in the set, a relatively large number of user equipment can be supported.

Note though that the particular phase coefficient sequences included in the set 18 and/or the size of the set 18 may depend on some desired balance between one or more of these desired properties. In some embodiments, for example, a phase coefficient sequence may be excluded from the set 18, even if it may be used to form a QPSK-based sequence with relatively low pair-wise cross-correlation (e.g., ≤0.75) with other QPSK-based sequences formable from phase coefficient sequences in the set 18, if that sequence has higher CM or PAPR than desired.

Accordingly, in one or more embodiments, one or more sequences with highest CM or PAPR may be excluded from the set 18 in FIG. 2D. In one embodiment, therefore, the set 18 may just include {1, 1, 1, 1, 3, −3}, {1, 1, 3, 1, −3, 3}, {1, −1, −1, −1, 1, −3}, {1, −1, 3, −3, −1, −1}, {1, 3, 1, −1, −1, 3}, {1, −3, −3, 1, 3, 1}, {−1, −1, 1, −3, −3, −1}, {−1, −1, −1, 3, −3, −1}, {3, −1, 1, −3, −3, 3}, {3, −1, 3, −3, −1, 1}, {3, −3, 3, −1, 3, 3}, {−3, 1, 3, 1, −3, −1}, {−3, 1, −3, 3, −3, −1}, and {−3, 3, −3, 1, 1, −3}.

As a general proposition, therefore, the set 18 may include at least: (A) {1, 1, 1, 1, 3, −3} and {−3, 3, −3, 1, 1, −3}; or (B) {−1, −1, −1, 3, −3, −1} and either {3, −3, 3, −1, 3, 3} or {1, 3, 1, −1, −1, 3}, as shown in FIGS. 2A-2O. In any of these cases, one or more other phase coefficient sequences shown in FIG. 2D may also be included in the set 18.

In some embodiments, the network node 14 transmits information to the user equipment 12 that indicates the length-6 phase coefficient sequence on which the user equipment 12 is to generate the QPSK-based sequence for the reference signal 16. In one embodiment, for example, a table at the user equipment 12 specifies the defined set 18 of length-6 phase coefficient sequences, e.g., with different sequences having different indices. In this case, the network node 14 may transmit an index into the table at the user equipment 12 in order to specify a certain one of the phase coefficient sequences that the user equipment 12 is to use.

In other embodiments, the phase coefficient sequence that the user equipment 12 is to use is defined in a cell-specific way. In one embodiment, for example, the user equipment 12 determines the phase coefficient sequence to use based on a cell identity of a cell serving the user equipment 12. The user equipment 12 may for instance determine the phase coefficient sequence to use based on a modulus of the cell identity, e.g., with respect to a number of unique length-6 QPSK-based sequences in the defined set 18.

Embodiments for determining the phase coefficient sequence to use may also be combinable. For example, in some embodiments, the phase coefficient sequence that the user equipment 12 is to use initially or by default is defined in a cell-specific way (e.g., based on cell identity). But that default phase coefficient sequence may be overridden by dedicated signaling (e.g., via an uplink grant, RRC signaling, etc.) from the network node 14. This dedicated signaling may for instance indicate an index into a table at the user equipment 12 as described above.

Mathematically, the QPSK-based sequence in some embodiments comprises a sequence $\tilde{r}(n)=e^{j\varphi(n)\pi/4}$, n=0, 1, . . . , M, where $\varphi(n)$ is a phase coefficient sequence and M is the length of the phase coefficient sequence. As indicated above, M=6 in some embodiments.

The QPSK-based sequence may function as a base sequence from which the reference signal 16 is determined. In these and other embodiments, for example, a reference signal sequence $r_{u,v}^{(\alpha)}(n)$ may be defined by a cyclic shift $\alpha$ of a base sequence $\bar{r}_{u,v}(n)$ according to $$r_{u,v}^{(\alpha)}(n)=e^{j\alpha n}\bar{r}_{u,v}(n),\ 0\leq n\geq M_{sc}^{RS}$$

where $M_{sc}^{RS}$ is the length of the reference signal sequence. Multiple reference signal sequences may be defined from a single base sequence through different values of $\alpha$.

Base sequences $\bar{r}_{u,v}(n)$ may be divided into groups, where $u \in \{0, 1, \ldots, 29\}$ is the group number and v is the base sequence number within the group. The sequence group number u and the number v within the group may vary in time.

Figure 3:
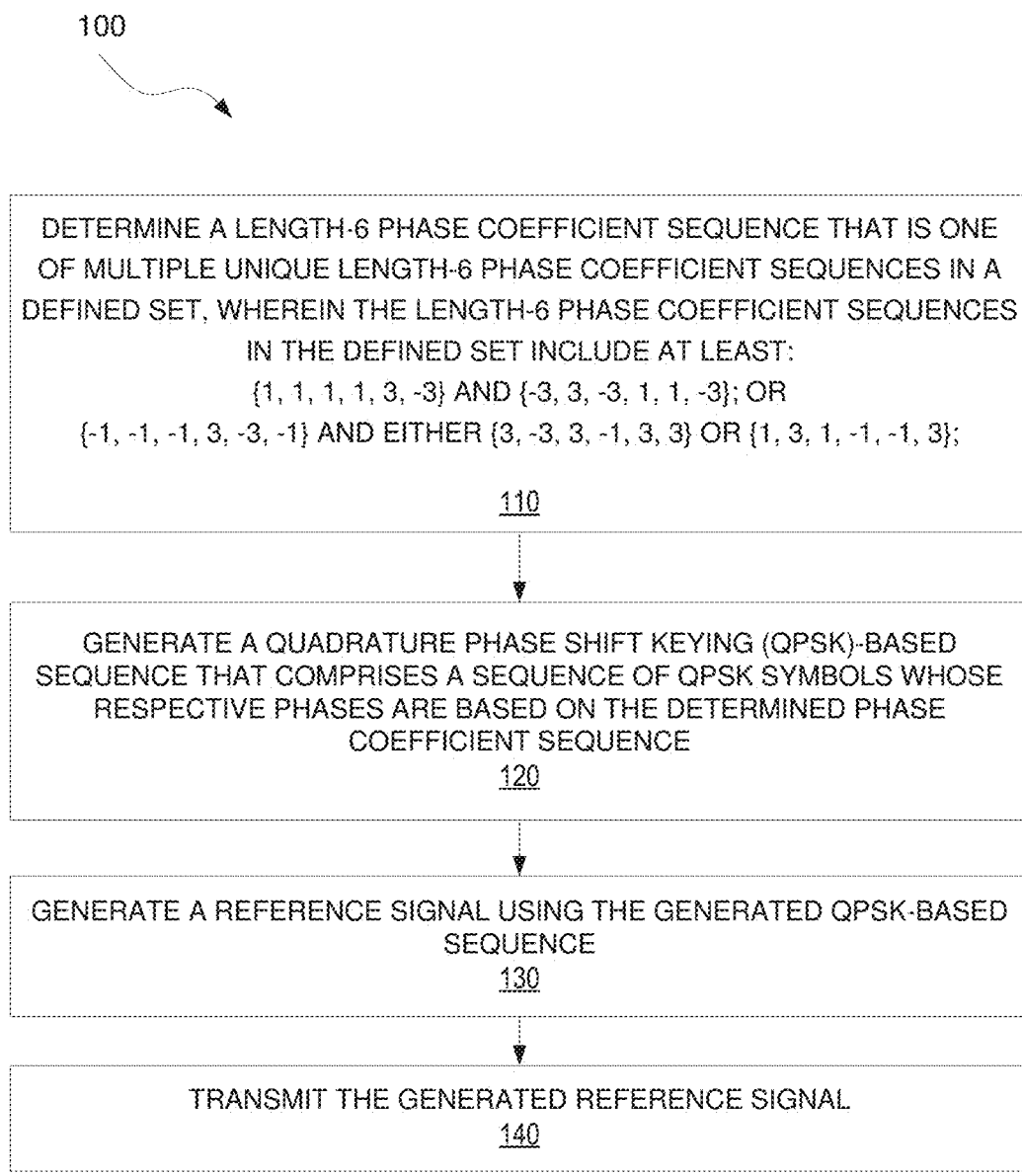
FIG. 3 is a logic flow diagram of a method performed by a user equipment according to some embodiments.

In view of the above modifications and variations, FIG. 3 illustrates a method 100 performed by a user equipment 12 for transmitting a reference signal 16 in a wireless communication system 10 according to some embodiments. As shown, the method 100 includes determining a length-6 phase coefficient sequence that is one of multiple unique length-6 phase coefficient sequences in a defined set 18, wherein the length-6 phase coefficient sequences in the defined set include at least: $\{1, 1, 1, 1, 3, -3\}$ and $\{-3, 3, -3, 1, 1, -3\}$; or $\{-1, -1, -1, 3, -3, -1\}$ and either $\{3, -3, 3, -1, 3, 3\}$ or $\{1, 3, 1, -1, -1, 3\}$ (Block 110). The method 100 also includes generating a quadrature phase shift keying (QPSK)-based sequence that comprises a sequence of QPSK symbols whose respective phases are based on the determined phase coefficient sequence (Block 120). The method 100 further includes generating a reference signal 16 using the generated QPSK-based sequence (Block 130), and transmitting the generated reference signal 16 to a network node 14 in the wireless communication system 10 (Block 140).

FIG. 4 illustrates a corresponding method 200 performed by a network node 14 according to some embodiments. The method 200 includes determining a length-6 phase coefficient sequence that is one of multiple unique length-6 phase coefficient sequences in a defined set 18, wherein the length-6 phase coefficient sequences in the defined set include at least: $\{1, 1, 1, 1, 3, -3\}$ and $\{-3, 3, -3, 1, 1, -3\}$; or $\{-1, -1, -1, 3, -3, -1\}$ and either $\{3, -3, 3, -1, 3, 3\}$ or $\{1, 3, 1, -1, -1, 3\}$ (Block 210). The method 200 also includes receiving, from a user equipment 12, a reference signal 16 generated based on a quadrature phase shift keying (QPSK)-based sequence that comprises a sequence of QPSK symbols whose respective phases are based on the determined phase coefficient sequence (Block 220).

In some embodiments, the method 200 also includes transmitting information to the user equipment 12 indicating the determined length-6 phase coefficient sequence as being a sequence on which the QPSK-based sequence is to be generated. The information may for instance comprise an index into a table at the user equipment 12, wherein the table specifies the defined set of unique length-6 phase coefficient sequences.

Note that the length-6 phase coefficient sequences described above were non-limiting examples. In other embodiments herein, the length-6 phase coefficient sequences in the defined set 18 may be different from those described above.

According to some embodiments, the first three elements of at least some of the length-6 phase coefficient sequences in the defined set 18 may be the same as the first three elements of the length-6 phase coefficient sequences described above. The remaining elements of the sequences may differ from or be the same as the remaining elements of the sequences described above.

For example, in some embodiments, the length-6 phase coefficients in the defined set 18 include at least a sequence whose first three elements are $\{1, 1, 1\}$ and a sequence whose first three elements are $\{-3, 3, -3\}$. Alternatively, the length-6 phase coefficients in the defined set 18 include at least a sequence whose first three elements are $\{-1, -1, -1\}$ and a sequence whose first three elements are $\{3, -3, 3\}$. In yet other embodiments, the length-6 phase coefficients in the defined set 18 include at least a sequence whose first three elements are $\{-1, -1, -1\}$ and a sequence whose first three elements are $\{1, 3, 1\}$.

More broadly, in some embodiments, the length-6 phase coefficients in the defined set 18 include at least a sequence whose first three elements are $\{1, 1, 1\}$ and a sequence whose first three elements are either $\{-3, 3, -3\}$, $\{-3, -1, -3\}$, or $\{-1, 3, -1\}$. Alternatively, the length-6 phase coefficients in the defined set 18 include at least a sequence whose first three elements are $\{-1, -1, -1\}$ and a sequence whose first three elements are either $\{3, -3, 3\}$, $\{3, 1, 3\}$, or $\{1, 3, 1\}$. In any of these embodiments, the first 3 elements of each of the length-6 phase coefficient sequences in the defined set 18 may be unique from the first 3 elements of each of the other length-6 phase coefficient sequences in the defined set 18.

According to some embodiments, with the length-6 phase coefficient sequences in the defined set 18 defined in any of these ways, phase coefficient sequences of a shorter length (e.g., length-3) may be formable from the length-6 phase coefficient sequences. For example, truncation of the length-6 phase coefficient sequences in the defined set 18 (e.g., truncation of the last 3 elements of each length-6 sequence) may produce a set of length-3 phase coefficient sequences. This set of length-3 phase coefficient sequences may inherent some or all of the desired properties described above with respect to the length-6 phase coefficient sequences.

Accordingly, FIG. 5 illustrates a method 300 performed by a user equipment 12 for transmitting a reference signal 16 in a wireless communication system 10 (e.g., a NB-IoT system). The method 300 comprises determining a length-6 phase coefficient sequence that is one of N unique length-6 phase coefficient sequences in a defined set 18, or determining a length-3 phase coefficient sequence that is a truncated version of one of the N unique length-6 phase coefficient sequences in the defined set 18 (Block 310). In some embodiments, N=16. Regardless, N unique length-3 phase coefficient sequences are formable as truncated versions of the N unique length-6 phase coefficient sequences. Notably, the N unique length-3 phase coefficient sequences include at least $\{1, 1, 1\}$ and either $\{-3, 3, -3\}$, $\{-3, -1, -3\}$, or $\{-1, -3, -1\}$, or negative versions thereof.

A negative version of a sequence herein refers to a sequence whose elements are each multiplied by $-1$. The negative version of $\{1, 1, 1\}$ therefore is $\{-1, -1, -1\}$. Accordingly, in some embodiments, the N unique length-3 phase coefficient sequences include at least $\{-1, -1, -1\}$ and either $\{3, -3, 3\}$, $\{3, 1, 3\}$, or $\{1, 3, 1\}$.

Regardless, the method 300 as shown in FIG. 5 further comprises generating a quadrature phase shift keying (QPSK)-based sequence that comprises a sequence of QPSK symbols whose respective phases are based on the determined phase coefficient sequence (Block 320). In one or more embodiments, for example, the QPSK-based sequence is generated as a sequence $\tilde{r}(n) = e^{j\varphi(n)\pi/4}$, $n=0, 1, \ldots, M$, where $\varphi(n)$ is the determined phase coefficient sequence and M is the length of that phase coefficient sequence (i.e., either 3 or 6).

The method 300 as shown further comprises generating a reference signal 16 (e.g., a demodulation reference signal, DMRS) using the generated QPSK-based sequence (Block 330). In some embodiments, this reference signal 16 may be viewed as a sequence of "signals". The method 300 then comprises transmitting the generated reference signal (Block 340).

Note that in some embodiments the length of the QPSK-based sequence and correspondingly the length of the phase coefficient sequence may be determined based on a grant received by the user equipment 12 indicating a number of radio resources over which the reference signal 16 is to be transmitted (i.e., either 3 or 6 resources). These radio resources may be for example tones or subcarriers, such that the reference signal 16 is to be transmitted over 3 or 6 tones or subcarriers.

Alternatively or additionally, the determining in FIG. 5 may be performed based on a cell identity (e.g., of the user equipment's serving cell). In and other embodiments, the user equipment 12 may store or otherwise be preconfigured with the defined set 18 of length-6 phase coefficient sequences, e.g., as an indexed table. If the reference signal 16 is to be transmitted over 6 radio resources, the user equipment 12 may determine a length-6 phase coefficient sequence from the defined set 18, e.g., by looking up the sequence with a certain index. This index may be determined by taking the modulus of the cell ID with a number of sequences in the defined set (e.g., 16). By contrast, if the reference signal 16 is to be transmitted over 3 radio resources, the user equipment 12 may first determine a length-6 phase coefficient sequence from the defined set 18 as described above, but may then truncate that retrieved length-6 sequence to have a length of 3. The user equipment 12 in some embodiments does so by forming a truncated version of the length-6 sequence from the first 3 elements of that sequence, such that the truncated version is a length-3 sequence. In this case, the network need not broadcast different phase coefficient sequences for different length reference signal transmissions (e.g., for 3-tone and 6-tone transmissions).

In other embodiments, though, the network node 14 may indeed broadcast different phase coefficient sequences for different length reference signal transmissions.

In some embodiments, the network node 14 broadcasts whether a phase coefficient sequence should be determined using the modulus of a cell ID with the number of sequences (e.g., 16), or whether a particular entry in a sequence table should be used.

In some embodiments, broadcasted or default phase coefficient sequences (e.g., as defined in a preconfigured table at the device) are defined in a cell-specific way (e.g., based on cell ID).

In some embodiments, broadcasted or default phase coefficient sequences may be overridden by dedicated signaling (e.g., via an uplink grant, RRC signaling, etc.). In this case, the determining at Block 310 may instead entail determining the phase coefficient sequence from dedicated signaling received from a network node 14 that indicates the phase coefficient sequence.

In one or more embodiments, the N unique length-3 phase coefficient sequences further include at least {1, 1, −1} and {1, 1, 3}.

FIG. 6 illustrates corresponding processing performed by a network node 14 according to some embodiments. The network node 14 is in a wireless communication system 10 for controlling generation of a reference signal 16 based on a quadrature phase shift keying (QPSK)-based sequence. As shown in FIG. 6, processing at the network node 14 in this regard may comprise determining a length-6 phase coefficient sequence that is one of N unique length-6 phase coefficient sequences in a defined set 18, or determining a length-3 phase coefficient sequence that is a truncated version of one of the N unique length-6 phase coefficient sequences in the defined set 18, wherein N unique length-3 phase coefficient sequences are formable as truncated versions of the N unique length-6 phase coefficient sequences, wherein the N unique length-3 phase coefficient sequences include at least {1, 1, 1} and either {−3, 3, −3}, {−3, −1, −3}, or {−1, −3, −1}, or negative versions thereof (Block 410). Processing may also comprise transmitting information indicating the determined phase coefficient sequence as being a sequence on which the QPSK-based sequence is to be generated (Block 420). This information may indicate the determined sequence as an index for example into a table at a user equipment 12.

In some embodiments, the network node 14 configures length-3 sequences with low pair-wise cross-correlation among neighbor cells. In some embodiments, it is preferred that the network node 14 preferentially allocate certain length-3 sequences first (e.g., the 4 in Table 3 below). But as long as the neighboring cells use base sequences that have low-cross correlation, then acceptable performance may be achieved.

Note that a user equipment 12 as described herein may perform any of the processing herein by implementing any functional means or units. In one embodiment, for example, the user equipment 12 comprises respective circuits or circuitry configured to perform the steps shown in FIG. 3 and/or FIG. 5. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 7A:
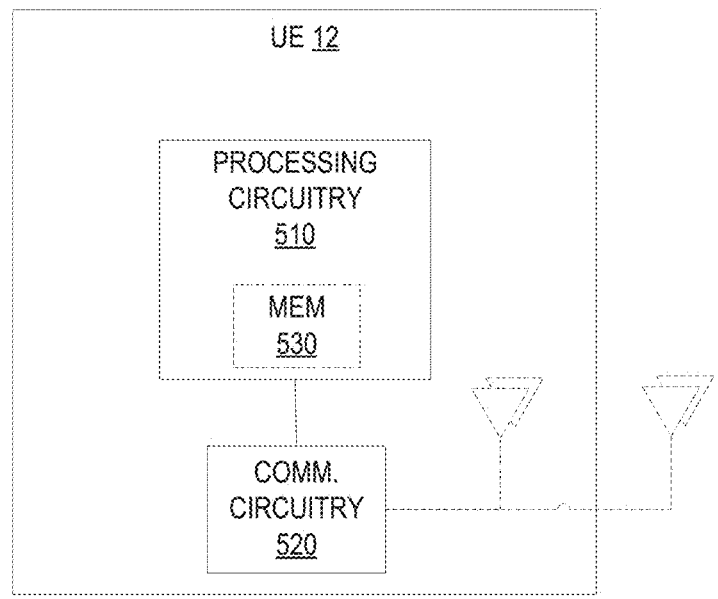
FIG. 7A is a block diagram of a user equipment according to some embodiments.

FIG. 7A illustrates a user equipment 12 in accordance with one or more embodiments. As shown, the user equipment 12 includes processing circuitry 510 and communication circuitry 520. The communication circuitry 520 (e.g., radio circuitry) is configured to transmit and/or receive information to and/or from one or more other nodes, e.g., via any communication technology. Such communication may occur via one or more antennas that are either internal or external to the user equipment 12. The processing circuitry 510 is configured to perform processing described above, e.g., in FIG. 3 and/or FIG. 5, such as by executing instructions stored in memory 530. The processing circuitry 510 in this regard may implement certain functional means, units, or modules.

Figure 7B:
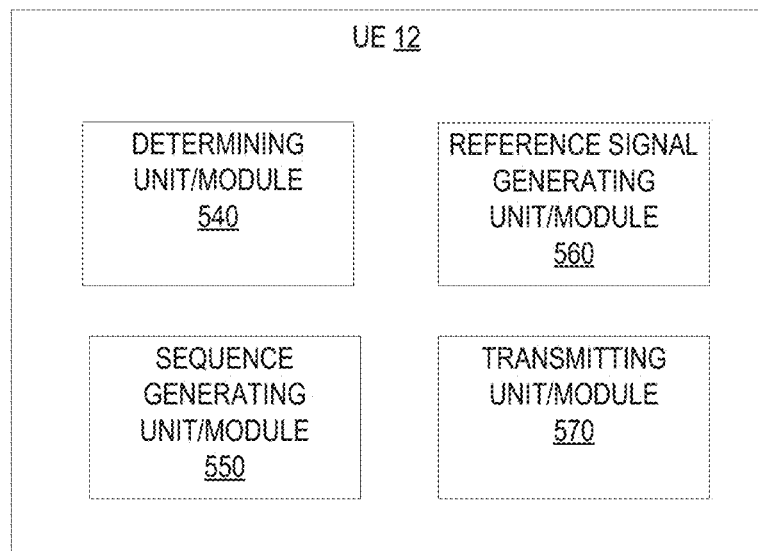
FIG. 7B is a block diagram of a user equipment according to other embodiments.

FIG. 7B illustrates a user equipment 12 implemented in accordance with one or more other embodiments. As shown, the user equipment 12 implements various functional means, units, or modules, e.g., via the processing circuitry 510 in FIG. 7A and/or via software code. These functional means, units, or modules, e.g., for implementing the method in FIG. 3 and/or FIG. 5, include for instance a determining module 540 for determining a phase coefficient sequence as described above in FIG. 3 and/or FIG. 5. Also included is a sequence generating module 550 for generating a quadrature phase shift keying (QPSK)-based sequence that comprises a sequence of QPSK symbols whose respective phases are based on the determined phase coefficient sequence. Further included is a reference signal generating module 560 for generating a reference signal 16 using the generated QPSK-based sequence. Also included is a transmitting module 570 for transmitting the generated reference signal 16.

Also note that a network node 14 (e.g., base station) as described above may perform any of the processing herein by implementing any functional means or units. In one embodiment, for example, the network node 14 comprises respective circuits or circuitry configured to perform the steps shown in FIG. 4 and/or FIG. 6. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 8A:
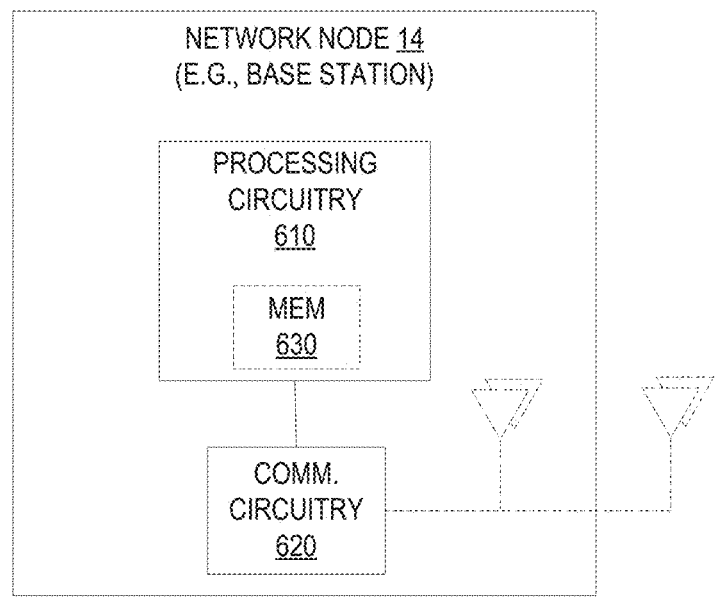
FIG. 8A is a block diagram of a network node according to some embodiments.

FIG. 8A illustrates a network node 14 in accordance with one or more embodiments. As shown, the network node 14 includes processing circuitry 610 and communication circuitry 620. The communication circuitry 620 (e.g., radio circuitry) is configured to transmit and/or receive information to and/or from one or more other nodes, e.g., via any communication technology. Where the network node 14 comprises a radio node, such communication may occur via one or more antennas that are either internal or external to the network node 14. The processing circuitry 610 is configured to perform processing described above, e.g., in FIG. 4 and/or FIG. 6, such as by executing instructions stored in memory 630. The processing circuitry 610 in this regard may implement certain functional means, units, or modules.

Figure 8B:
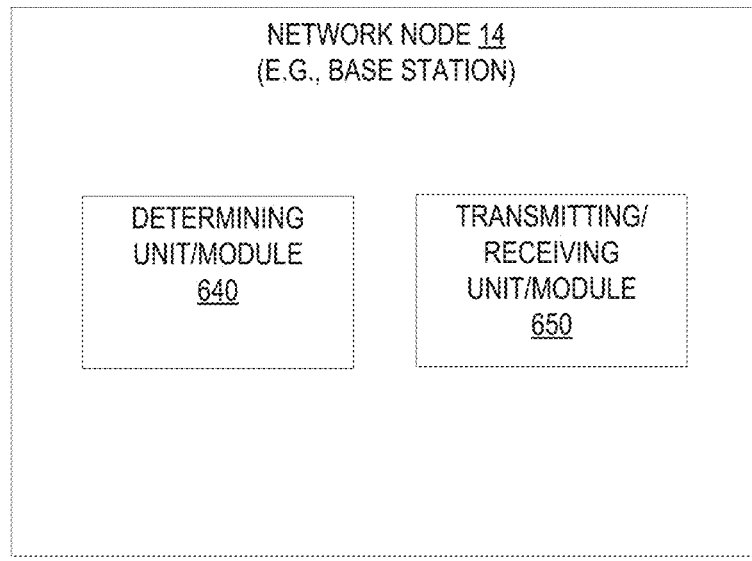
FIG. 8B is a block diagram of a network node according to other embodiments.

FIG. 8B illustrates a network node 14 implemented in accordance with one or more other embodiments. As shown, the network node 14 implements various functional means, units, or modules, e.g., via the processing circuitry 610 in FIG. 8A and/or via software code. These functional means, units, or modules, e.g., for implementing the method in FIG. 4 and/or FIG. 6, include for instance a determining module for determining a phase coefficient sequence as described in FIG. 4 and/or FIG. 6. The network node 14 may also include a transmitting or receiving module or unit 650 for receiving the reference signal 16 and/or for transmitting information indicating the determined phase coefficient sequence as being a sequence on which the QPSK-based sequence is to be generated.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

Some embodiments herein will now be discussed in the context of NB-IoT systems in particular. One way of solving the UL RS design problem in NB-IOT is to truncate the LTE length-12 uplink reference symbol sequences. However, a brute-force truncation is going to destroy the nice properties, e.g., low cross-correlation of the reference symbol sequences. Some design principles of NB-IoT uplink reference symbol design principles have been discussed, but no detailed designs have been given. See, e.g., R1-160092, NB-IoT-Design Considerations for UL reference signals, source Ericsson, 3GPP TSG-RAN1 NB-IOT Ad Hoc 18-20 Jan. 2016, Budapest, Hungary and R1-160125, Uplink DMRS design for NB-IoT, source ETRI, 3GPP TSG-RAN1 NB-IOT Ad Hoc 18-20 Jan. 2016, Budapest, Hungary. In R1-160092, it is proposed that even if less than 12 subcarriers are allocated to an NB-IoT devices, it still uses the entire 12 subcarriers to transmit the reference signals. This is not a preferred solution, as (1) it may cause inter and intra cell interference, and (2) the performance suffers near-far problem caused by received power difference at the base station or the eNB.

Several proposals have been given for length-3 and length-6 DM-RS base sequences design. See R1-161851, "On UL DMRS design for NB-IoT", source Nokia Networks, Alcatel-Lucent, Alcatel-Lucent Shanghai Bell, 3GPP TSG RAN1 NB-IoT Ad-Hoc meeting, Sophia Antipolis, France, 22-24 Mar. 2016, R1-162730, "Uplink DMRS Sequence Design for NB-IoT", source Lenovo, 3GPP TSG RAN WG1 Meeting #84bis, Busan, Korea, 11-15 Apr. 2016, and R1-161942, "Uplink Narrowband DM-RS", source Qualcomm Incorporated, 3GPP TSG RAN1 NB-IoT Ad-Hoc meeting. Sophia Antipolis, France, 22-24 Mar. 2016. However, the length-3 and length-6 DM-RS base sequences given in R1-161851 are required to be specified and signaled separately. In R1-162730, only 2 length-3 and 4 length-6 base sequences are identified. This is problematic for cell planning, as the number of base sequences is very small. Although as claimed in R1-162730 that time domain orthogonal cover sequence can be used to increase the number of sequences, as the length of the orthogonal cover sequence is limited, it would only give a limited number of DM-RS sequences in total. The design in R1-161942 gives 7 available length-3 base sequences.

One or more embodiments herein propose QPSK-based sequences for generation of UL RS in case of 3-tone and/or 6-tone transmission format in NB-IoT. In some embodiments, the methods that can be used to generate length-3 and length-6 reference symbol sequences can be used for NB-IoT uplink multi-tone transmission when 3 and 6 subcarriers are allocated.

Compared to the sequences given in R1-161851, R1-162730, and R1-161942, sequences in some embodiments do not require generating separate sets of length-3 base sequences, but can instead use truncated length-6 base sequences that include the good length-3 sequences after truncation. After truncation, up to 16 unique length-3 base sequences can be generated, and some of them have low pair-wise cross-correlation. Therefore, the network can still configure the length-3 sequences with low pair-wise cross-correlation among neighboring cells.

Moreover, a common framework can be used to specify the length-6 and length-3 base sequences, as well as a unified signaling method can be used. Therefore, comparing to R1-161851, R1-162730, and R1-161942, less standardization efforts and signaling are needed.

If necessary, cyclic shifts can also be used to increase the total number of available sequences.

In more detail, in LTE, the reference signal (RS) for 1 and 2 physical resource blocks (PRBs) are based on QPSK-based sequences, and are generated by computer search. In general, a base sequence is given by:

$$\tilde{r}(n)=e^{j\varphi(n)\pi/4}, n=0,1,\ldots,M_{sc}^{RS}-1,$$

where $M_{sc}^{RS}$ is the number of subcarriers that $\tilde{r}(n)$ is mapped, and the values of $\varphi(n)$ are given in Table 5.5.1.2-1 and Table 5.5.1.2-2 of 3GPP TS 36.211 V13.0.0 (2015-12), 3rd Generation Partnership Project. In LTE, in order to support a sufficiently large number of UEs for uplink data transmission, a large number of DMRS sequences are needed. This is achieved by using base sequences together with cyclic shifts in time domain (i.e., linear phase rotation frequency domain) of a base sequence. The cyclically shifted versions of a base sequence are mutually orthogonal, and therefore can further lower the inter-cell interference. Additionally, they can be used within a cell in case of uplink MU-MIMO configurations in LTE. A set of 30 base sequences in case of length 12 and length 24 are specified explicitly to be used as UL DMRS for the cases that 1 or 2 PRBs are allocated to a UE. The base sequence used by a particular cell is obtained by either taking the modulus of the cell ID with 30, or broadcast as part of cell information. Additionally, a cyclic shift is applied afterwards to allow a sufficiently low inter-cell interference over a wide area.

For NB-IoT transmission, it is desirable to use QPSK-based sequences as well due to their constant amplitude and low cubic metric property. Therefore, the task here is to find $\varphi(n)$ that can generate reference signals with desired properties which can be used by NB-IoT uplink transmission. Since the slot format is the same for NB-IOT in the multi-tone transmissions as it is in LTE, unless otherwise motivated, the same UL DMRS positions in time should be used in NB-IoT as they are in LIE.

For uplink RS in case of 3-tone NB-IoT transmission, some embodiments provide length-3 base sequences that are based on QPSK symbols. The number of possible sequences is therefore $4^3=64$, where each element of the base sequence is drawn from QPSK with 4 constellation points $\{-3, -1, 1, 3\}$. Of these, half the sequences are simply a linear phase shift of the other half sequences, e.g. sequences $\{-1, 1, 3\}$ and $\{1, -1, -3\}$. Thus, there exist 32 possible length-3 reference symbol sequences.

If a subset of the 32 base sequences are used for the NB-IoT systems, as mentioned before, low cross-correlation property of the DM-RS is needed in order to minimize the inter-cell interference. Certainly there is a trade-off between the number of sequences and the cross-correlation statistics between sequence pairs. The lower the cross-correlation is required, the less number of sequences in a group can be found.

Table 1 summarizes the number of available base sequences with corresponding pair-wise maximum (normalized) time domain cross-correlation values for length-3 DM-RS sequences.

TABLE 1

| | Normalized maximum pair-wise cross-correlation threshold | | | | | |
|---|---|---|---|---|---|---|
| | 0.7 | 0.75 | 0.8 | 0.9 | 0.95 | 1 |
| Number of available base sequences | 0 | 2 | 2 | 2 | 4 | 32 |

According to a working assumption, 16 different base sequences should be provided. From computer search, however, it is not possible to find 16 different base sequences that have normalized maximum pair-wise cross-correlation less than 1. Notice, a normalized maximum pair-wise cross-correlation equaling 1 means the two sequences are fully correlated in the time domain, which is not a preferable situation. Table 2 gives three sets of DMRS base sequences with a normalized maximum pair-wise cross-correlation less than or equal to 0.75 which have the lowest average CM. Table 3 gives three sets of DMRS base sequences with a normalized maximum pair-wise cross-correlation less than or equal to 0.95 which have the lowest average CM. These DMRS base sequences will be considered in the next section as parts of selection criteria.

TABLE 2

| $\varphi(n)$ | | | | | | |
|---|---|---|---|---|---|---|
| −3 | 3 | −3 | and | 1 | 1 | 1 |
| −3 | −1 | −3 | and | 1 | 1 | 1 |
| −1 | −3 | −1 | and | 1 | 1 | 1 |

TABLE 3

| $\varphi(n)$ | | |
|---|---|---|
| −3 | 3 | −3 |
| 1 | 1 | 1 |
| 1 | 1 | −1 |
| 1 | 1 | 3 |
| −3 | −1 | −3 |
| 1 | 1 | 1 |
| 1 | 1 | −1 |
| 1 | 1 | 3 |
| −1 | −3 | −1 |
| 1 | 1 | 1 |
| 1 | 1 | −1 |
| 1 | 1 | 3 |

Notice that a phase shift of $\pi/2$ of the above sequence gives the same cross-correlation property, e.g., $\tilde{r}(n)$ generated from (−3 3 −3) is the same as $\tilde{r}(n)$ generated from (3 −3 3) when it comes to cross-correlation property, and therefore, only one of the two is listed.

One or more embodiments herein generate the length-3 base sequences by truncating the length-6 base sequences. In this way, only one set of base sequences needs to be specified in the standards. In this case, the length-6 DMRS based sequences need to give 16 unique length-3 base sequences after truncation. If multiple sets of length-6 DMRS based sequences are available, the ones with lower pair-wise cross correlations and CM should be considered.

Table 4 summarizes the number of available base sequences with corresponding pair-wise maximum (normalized) time domain cross-correlation threshold values.

TABLE 4

| | Normalized maximum pair-wise cross-correlation threshold | | | | | | | |
|---|---|---|---|---|---|---|---|---|
| | 0.5 | 0.6 | 0.65 | 0.7 | 0.75 | 0.8 | 0.85 | 0.9 |
| Number of available base sequences | 0 | 4 | 4 | 8 | 16 | 16 | 16 | 64 |

Observe that length-6 base sequences allow lower pair-wise cross-correlation values (e.g., less than or equal to 0.75) than the length-3 sequences. Since it is expected that 6-tone transmission is used by UEs in fairly good coverage, they might transmit at lower power and therefore the CM is of less concern. However, if multiple sets of length-6 DM-RS sequences are available that have similar cross-correlations, then CM can be used for down selection. The following paragraph analyses how to choose a preferred sequence set.

As mentioned before, length-6 DMRS base sequences can be truncated to generate length-3 DMRS base sequences. In this case, the length-6 DMRS base sequences with lower pair-wise cross-correlations and CM after truncation should be considered. To be more specific, by using computer search, multiple sets of 16 length-6 DM-RS sequences that give normalized maximum pair-wise cross-correlation of less than or equal to 0.75 have been identified. Some embodiments use the following criteria when choosing the length-6 DM-RS sequences. After truncation, 16 unique length-3 DM-RS base sequences need to be generated for the length-6 DM-RS base sequences according to the working assumption above. The truncation in one or more embodiments involves taking the first 3 elements of each of the length-6 DM-RS base sequences (Note that similar cross-correlation properties are observed if the second parts of the length-6 sequences are used to generate the length-3 sequences). The average pair-wise cross-correlations in time domain need to be low. If multiple sets of length-6 DM-RS sequences have the same average pair-wise cross-correlations in the time domain, the ones that contain elements in Table 2 or Table 3 need to be considered. After the first 3 steps, if there are still multiple sets of length-6 DM-RS sequences left, the one with the lowest average CM should be chosen.

Figure 9B:
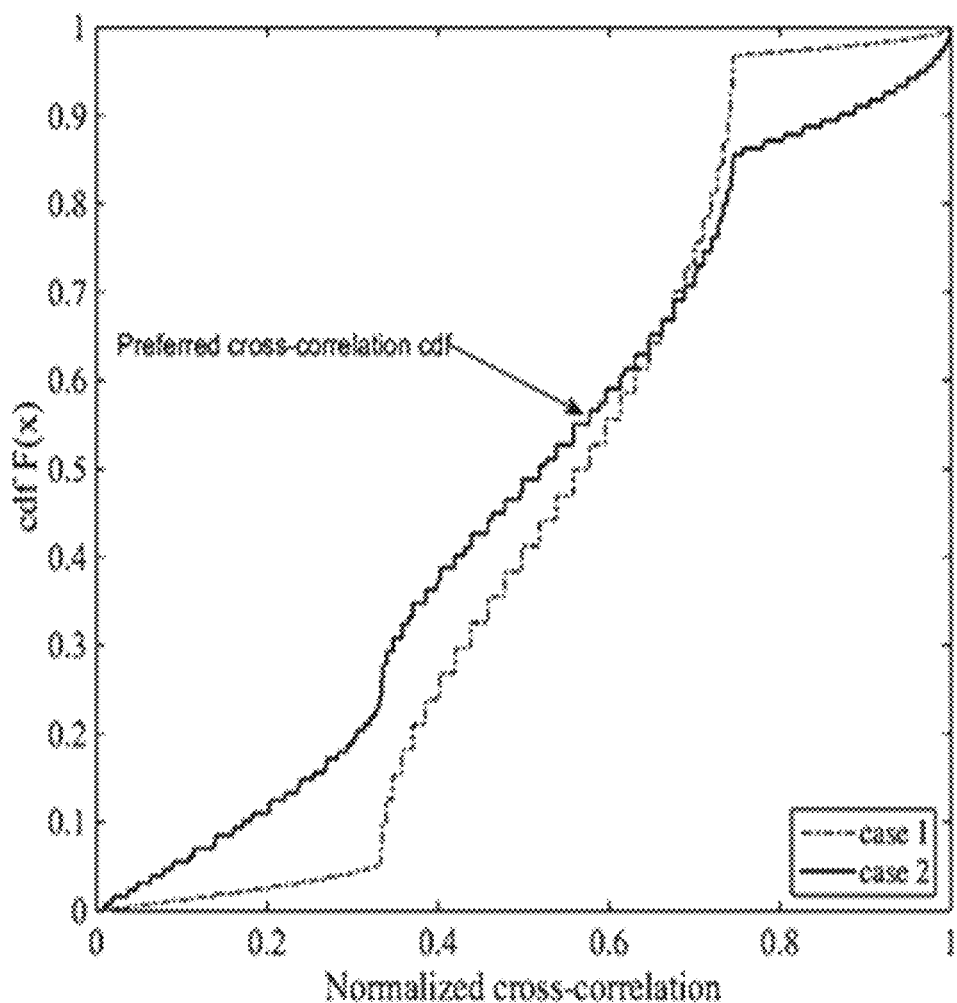
FIG. 9B is a graph showing the distribution of cross-correlation values for the different cases of FIG. 9A.

Note that the cross-correlation for all lags may be calculated. The sets of 16 length-6 DMRS sequences demonstrate two different cross-correlation properties, i.e., case 1 and case 2 shown in FIG. 9A. Note that in this figure, both cases correspond to the same allowed maximum pair-wise cross-correlation value, but the distribution (cumulative distribution function, cdf) of cross-correlation values is different. In general, case 1 is preferred, as FIG. 9B shows the average cross-correlation is lower.

There are multiple sets of 16 length-6 DM-RS base sequences that give the same cdf of the cross-correlation as case 1. By using the criteria, Table 5 gives an example of length-6 DM-RS base sequences. The suggested DM-RS base sequences contain the first length-3 sequence set given in Table 3 after truncation, as well as they have the average lowest CM among all the sets of sequences that contains the length-3 sequence given in Table 4 after truncation. Also, after truncation, all the length-3 base sequences are unique, and hence they gives 16 unique length-3 base sequences. Also, it allows the system to configure length-3 DMRS base sequences with lower cross-correlation among neighbouring cells.

TABLE 5

| Sequence index | $\varphi(n)$ | | | | | |
|---|---|---|---|---|---|---|
| 1 | 1 | 1 | 1 | 1 | 3 | −3 |
| 2 | 1 | 1 | −1 | −3 | −3 | 3 |
| 3 | 1 | 1 | 3 | 1 | −3 | 3 |
| 4 | 1 | −1 | −1 | −1 | 1 | −3 |
| 5 | 1 | −1 | 3 | −3 | −1 | −1 |
| 6 | 1 | 3 | 1 | −1 | −1 | 3 |
| 7 | 1 | −3 | −3 | 1 | 3 | 1 |
| 8 | −1 | −1 | 1 | −3 | −3 | −1 |
| 9 | −1 | −1 | −1 | 3 | −3 | −1 |
| 10 | 3 | −1 | 1 | −3 | −3 | 3 |
| 11 | 3 | −1 | 3 | −3 | −1 | 1 |
| 12 | 3 | 3 | −3 | −3 | −3 | −1 |
| 13 | 3 | −3 | 3 | −1 | 3 | 3 |

TABLE 5-continued

| Sequence index | $\varphi(n)$ | | | | | |
|---|---|---|---|---|---|---|
| 14 | −3 | 1 | 3 | 1 | −3 | −1 |
| 15 | −3 | 1 | −3 | 3 | −3 | −1 |
| 16 | −3 | 3 | −3 | 1 | 1 | −3 |

In some embodiments, which of these cell-specific base sequences is to be used by a UE in a certain cell may be obtained by taking the modulus of the cell ID with the number of base sequences. This can be signaled via system information, or RRC configurations, or other signaling mechanism. Indeed, in order to minimize the impact of inter-cell interference, the chosen of LTE UL DMRS sequence may be initialized based on the cell ID. This is a way to ensure the pseudo-randomness for the UL DMRS among neighbouring cells.

Similar to the LTE system, cyclic shifts can be applied to the base sequence to generate orthogonal reference symbols. Additionally, orthogonal cover codes (OCC) may be applied to increase the number of orthogonal UL DMRS configurations. The orthogonal DMRS obtained via cyclic shifts and/or orthogonal cover codes can be suitable assigned to UEs within a cell or across neighboring cells to mitigate intra- and inter-cell interference respectively.

Despite particular applicability to NB-IoT in some examples, it will be appreciated that the techniques may be applied to other wireless networks, including eMTC as well as to successors of the E-UTRAN. Thus, references herein to signals using terminology from the 3GPP standards for LTE should be understood to apply more generally to signals having similar characteristics and/or purposes, in other networks.

A radio node herein is any type of node (e.g., a base station or wireless communication device) capable of communicating with another node over radio signals. A radio network node is any type of radio node within a wireless communication network, such as a base station. A wireless communication device is any type of radio node capable of communicating with a radio network node over radio signals. A wireless communication device may therefore refer to a machine-to-machine (M2M) device, a machine-type communications (MTC) device, a NB-IoT device, etc. The wireless device may also be a user equipment (UE), however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Furthermore, in an NB-IOT context, it may be the case that, to support lower manufacturing costs for NB-IOT devices, the transmission bandwidth is reduced to one physical resource block (PRB) of size 180 KHz. Both frequency division duplexing (FDD) and TDD are supported. For FDD (i.e. the transmitter and receiver operate at different carrier frequencies) only half-duplex mode needs to be supported in the UE. The lower complexity of the devices (e.g. only one transmission/receiver chain) means that a small number of repetitions might be needed also in normal coverage. Further, to alleviate UE complexity, the working assumption may be to have cross-subframe scheduling. That is, a transmission is first scheduled on Enhanced Physical DL Control Channel (E-PDCCH aka M-EPDCCH) and then the first transmission of the actual data on the Physical DL Shared Channel (PDSCH) is carried out after the final transmission of the M-EPDCCH.

The present invention may, of course, be carried out in other ways than those specifically set forth herein without departing from essential characteristics of the invention. The present embodiments are to be considered in all respects as illustrative and not restrictive.

What is claimed is:

1. A user equipment for transmitting a reference signal in a wireless communication system, the user equipment comprising:
    processing circuitry and a memory, the memory containing instructions executable by the processing circuitry whereby the user equipment is configured to:
        determine a length-6 phase coefficient sequence that is one of multiple unique length-6 phase coefficient sequences in a defined set, wherein the length-6 phase coefficient sequences in the defined set include at least: {1, 1, 1, 1, 3, −3} and {−3, 3, −3, 1, 1, −3}; or {−1, −1, −1, 3, −3, −1} and either {3, −3, 3, −1, 3, 3} or {1, 3, 1, −1, −1, 3}, wherein the defined set includes at least 14 unique length-6 phase coefficient sequences, wherein length-6 QPSK-based sequences formable from the length-6 phase coefficient sequences in the defined set have a normalized maximum pair-wise cross-correlation in the time domain less than or equal to 0.75, and wherein the normalized maximum pair-wise cross-correlation in the time domain is calculated such that the normalized maximum pair-wise cross-correlation of length-6 QPSK-based sequences in any defined set having more than 16 unique length-6 phase coefficient sequences is greater than 0.85;
        generate a quadrature phase shift keying, QPSK-based sequence that comprises a sequence of QPSK symbols whose respective phases are based on the determined phase coefficient sequence;
        generate a reference signal using the generated QPSK-based sequence; and
        transmit the generated reference signal to a network node in the wireless communication system.

2. The user equipment of claim 1, wherein the unique length-6 phase coefficient sequences in the defined set include: {1, 1, 1, 1, 3, −3}, {1, 1, −1, −3, −3, 3}, {1, 1, 3, 1, −3, 3}, {1, −1, −1, −1, 1, −3}, {1, −1, 3, −3, −1, −1}, {1, 3, 1, −1, −1, 3}, {1, −3, −3, 1, 3, 1}, {−1, −1, 1, −3, −3, −1}, {−1, −1, −1, 3, −3, −1}, {3, −1, 1, −3, −3, 3}, {3, −1, 3, −3, −1, 1}, {3, 3, −3, −3, −3, −1}, {3, −3, 3, −1, 3, 3}, {−3, 1, 3, 1, −3, −1}, {−3, 1, −3, 3, −3, −1}, and {−3, 3, −3, 1, 1, −3}.

3. The user equipment of claim 1, wherein the unique length-6 phase coefficient sequences in the defined set include: {1, 1, 1, 1, 3, −3}, {1, 1, 3, 1, −3, 3}, {1, −1, −1, −1, 1, −3}, {1, −1, 3, −3, −1, −1}, {1, 3, 1, −1, −1, 3}, {1, −3, −3, 1, 3, 1}, {−1, −1, 1, −3, −3, −1}, {−1, −1, −1, 3, −3, −1}, {3, −1, 1, −3, −3, 3}, {3, −1, 3, −3, −1, 1}, {3, −3, 3, −1, 3, 3}, {−3, 1, 3, 1, −3, −1}, {−3, 1, −3, 3, −3, −1}, and {−3, 3, −3, 1, 1, −3}.

4. The user equipment of claim 1, wherein the unique length-6 phase coefficient sequences in the defined set include {1, 1, 1, 1, 3, −3} and {−3, 3, −3, 1, 1, −3}, and one or more of: {1, 1, −1, −3, −3, 3}, {1, 1, 3, 1, −3, 3}, {1, −1, −1, −1, 1, −3}, {1, −1, 3, −3, −1, −1}, {1, 3, 1, −1, −1, 3}, {1, −3, −3, 1, 3, 1}, {−1, −1, 1, −3, −3, −1}, {−1, −1, −1, 3, −3, −1}, {3, −1, 1, −3, −3, 3}, {3, −1, 3, −3, −1, 1}, {3, 3, −3, −3, −3, −1}, {3, −3, 3, −1, 3, 3}, {−3, 1, 3, 1, −3, −1}, and {−3, 1, −3, 3, −3, −1}.

5. The user equipment of claim 1, wherein the unique length-6 phase coefficient sequences in the defined set include {−1, −1, −1, 3, −3, −1} and {3, −3, 3, −1, 3, 3}, and one or more of: {1, 1, 1, 1, 3, −3}, {1, 1, −1, −3, −3, 3}, {1, 1, 3, 1, −3, 3}, {1, −1, −1, −1, 1, −3}, {1, −1, 3, −3, −1, −1}, {1, 3, 1, −1, −1, 3}, {1, −3, −3, 1, 3, 1}, {−1, −1, 1, −3, −3, −1}, {3, −1, 1, −3, −3, 3}, {3, −1, 3, −3, −1, 1}, {3, 3, −3, −3, −3, −1}, {−3, 1, 3, 1, −3, −1}, {−3, 1, −3, 3, −3, −1}, and {−3, 3, −3, 1, 1, −3}.

6. The user equipment of claim 1, wherein the unique length-6 phase coefficient sequences in the defined set include {−1, −1, −1, 3, −3, −1} and {1, 3, 1, −1, −1, 3}, and one or more of {1, 1, −1, −3, −3, 3}, {1, 1, 3, 1, −3, 3}, {1, −1, −1, −1, 1, −3}, {1, −1, 3, −3, −1, −1}, {1, −3, −3, 1, 3, 1}, {−1, −1, 1, −3, −3, −1}, {3, −1, 1, −3, −3, 3}, {3, −1, 3, −3, −1, 1}, {3, 3, −3, −3, −3, −1}, {3, −3, 3, −1, 3, 3}, {−3, 1, 3, 1, −3, −1}, and {−3, 1, −3, 3, −3, −1}.

7. The user equipment of claim 1, wherein the QPSK-based sequence comprises a sequence $\tilde{r}(n) = e^{j\varphi(n)\pi/4}$, n=0, 1, . . . , M, where $\varphi(n)$ is the determined phase coefficient sequence and M is the length of the determined phase coefficient sequence.

8. The user equipment of claim 1, wherein the reference signal is a cyclic shift of the QPSK-based sequence.

9. The user equipment of claim 1, wherein the memory contains instructions executable by the processing circuitry whereby user equipment is configured to receive information from the network node indicating the determined length-6 phase coefficient sequence as being a sequence on which the QPSK-based sequence is to be generated.

10. The user equipment of claim 9, wherein the information comprises an index into a table at the user equipment, wherein the table specifies the defined set of unique length-6 phase coefficient sequences.

11. The user equipment of claim 1, wherein the memory contains instructions executable by the processing circuitry whereby user equipment is configured to determine the length-6 phase coefficient sequence based on a cell identity of a cell serving the user equipment.

12. The user equipment of claim 11, wherein the memory contains instructions executable by the processing circuitry whereby user equipment is configured to determine the length-6 phase coefficient sequence by calculating the modulus of the cell identity with a number of unique length-6 QPSK-based sequences in the defined set.

13. The user equipment of claim 1, wherein the reference signal is transmitted on six subcarriers.

14. The user equipment of claim 1, wherein the reference signal is a demodulation reference signal.

15. The user equipment of claim 1, wherein the wireless communication system is a narrowband Internet of Things, NB-IoT, system.

16. The user equipment of claim 1, wherein the network node is a base station.

17. A network node in a wireless communication system, the network node comprising:
   processing circuitry and a memory, the memory containing instructions executable by the processing circuitry whereby the network node is configured to:
      determine a length-6 phase coefficient sequence that is one of multiple unique length-6 phase coefficient sequences in a defined set, wherein the length-6 phase coefficient sequences in the defined set include at least: {1, 1, 1, 1, 3, −3} and {−3, 3, −3, 1, 1, −3}; or {−1, −1, −1, 3, −3, −1} and either {3, −3, 3, −1, 3, 3} or {1, 3, 1, −1, −1, 3}, wherein the defined set includes at least 14 unique length-6 phase coefficient sequences, wherein length-6 QPSK-based sequences formable from the length-6 phase coefficient sequences in the defined set have a normalized maximum pair-wise cross-correlation in the time domain less than or equal to 0.75, and wherein the normalized maximum pair-wise cross-correlation in the time domain is calculated such that the normalized maximum pair-wise cross-correlation of length-6 QPSK-based sequences in any defined set having more than 16 unique length-6 phase coefficient sequences is greater than 0.85; and
      receive, from a user equipment, a reference signal generated based on a quadrature phase shift keying, QPSK-based sequence that comprises a sequence of QPSK symbols whose respective phases are based on the determined phase coefficient sequence.

18. The network node of claim 17, wherein the unique length-6 phase coefficient sequences in the defined set include: {1, 1, 1, 1, 3, −3}, {1, 1, −1, −3, −3, 3}, {1, 1, 3, 1, −3, 3}, {1, −1, −1, −1, 1, −3}, {1, −1, 3, −3, −1, −1}, {1, 3, 1, −1, −1, 3}, {1, −3, −3, 1, 3, 1}, {−1, −1, 1, −3, −3, −1}, {−1, −1, −1, 3, −3, −1}, {3, −1, 1, −3, −3, 3}, {3, −1, 3, −3, −1, 1}, {3, 3, −3, −3, −3, −1}, {3, −3, 3, −1, 3, 3}, {−3, 1, 3, 1, −3, −1}, {−3, 1, −3, 3, −3, −1}, and {−3, 3, −3, 1, 1, −3}.

19. The network node of claim 17, wherein the unique length-6 phase coefficient sequences in the defined set include: {1, 1, 1, 1, 3, −3}, {1, 1, 3, 1, −3, 3}, {1, −1, −1, −1, 1, −3}, {1, −1, 3, −3, −1, −1}, {1, 3, 1, −1, −1, 3}, {1, −3, −3, 1, 3, 1}, {−1, −1, 1, −3, −3, −1}, {−1, −1, −1, 3, −3, −1}, {3, −1, 1, −3, −3, 3}, {3, −1, 3, −3, −1, 1}, {3, −3, 3, −1, 3, 3}, {−3, 1, 3, 1, −3, −1}, {−3, 1, −3, 3, −3, −1}, and {−3, 3, −3, 1, 1, −3}.

20. The network node of claim 17, wherein the unique length-6 phase coefficient sequences in the defined set include {1, 1, 1, 1, 3, −3} and {−3, 3, −3, 1, 1, −3}, and one or more of: {1, 1, −1, −3, −3, 3}, {1, 1, 3, 1, −3, 3}, {1, −1, −1, −1, 1, −3}, {1, −1, 3, −3, −1, −1}, {1, 3, 1, −1, −1, 3}, {1, −3, −3, 1, 3, 1}, {−1, −1, 1, −3, −3, −1}, {−1, −1, −1, 3, −3, −1}, {3, −1, 1, −3, −3, 3}, {3, −1, 3, −3, −1, 1}, {3, 3, −3, −3, −3, −1}, {3, −3, 3, −1, 3, 3}, {−3, 1, 3, 1, −3, −1}, and {−3, 1, −3, 3, −3, −1}.

21. The network node of claim 17, wherein the unique length-6 phase coefficient sequences in the defined set include {−1, −1, −1, 3, −3, −1} and {3, −3, 3, −1, 3, 3}, and one or more of: {1, 1, 1, 1, 3, −3}, {1, 1, −1, −3, −3, 3}, {1, 3, 1, −3, 3}, {1, −1, −1, −1, 1, −3}, {1, −1, 3, −3, −1, −1}, {1, 3, 1, −1, −1, 3}, {1, −3, −3, 1, 3, 1}, {−1, −1, 1, −3, −3, −1}, {3, −1, 1, −3, −3, 3}, {3, −1, 3, −3, −1, 1}, {3, 3, −3, −3, −3, −1}, {−3, 1, 3, 1, −3, −1}, {−3, 1, −3, 3, −3, −1}, and {−3, 3, −3, 1, 1, −3}.

22. The network node of claim 17, wherein the unique length-6 phase coefficient sequences in the defined set include {−1, −1, −1, 3, −3, −1} and {1, 3, 1, −1, −1, 3}, and one or more of {1, 1, −1, −3, −3, 3}, {1, 1, 3, 1, −3, 3}, {1, −1, −1, −1, 1, −3}, {1, −1, 3, −3, −1, −1}, {1, −3, −3, 1, 3, 1}, {−1, −1, 1, −3, −3, −1}, {3, −1, 1, −3, −3, 3}, {3, −1, 3, −3, −1, 1}, {3, 3, −3, −3, −3, −1}, {−3, 1, 3, 1, −3, −1}, {−3, 1, −3, 3, −3, −1}.

23. The network node of claim 17, wherein the QPSK-based sequence comprises a sequence $\tilde{r}(n) = e^{j\varphi(n)\pi/4}$, n=0, 1, . . . , M, where φ (n) is the determined phase coefficient sequence and M is the length of the determined phase coefficient sequence.

24. The network node of claim 17, wherein the reference signal is a cyclic shift of the QPSK-based sequence.

25. The network node of claim 17, wherein the memory contains instructions executable by the processing circuitry whereby network node is configured to transmit information to the user equipment indicating the determined length-6 phase coefficient sequence as being a sequence on which the QPSK-based sequence is to be generated.

26. The network node of claim 25, wherein the information comprises an index into a table at the user equipment, wherein the table specifies the defined set of unique length-6 phase coefficient sequences.

27. The network node of claim 17, wherein the memory contains instructions executable by the processing circuitry whereby network node is configured to determine the length-6 phase coefficient sequence based on a cell identity of a cell serving the user equipment.

28. The network node of claim 27, wherein the memory contains instructions executable by the processing circuitry whereby network node is configured to determine the length-6 phase coefficient sequence by calculating the modulus of the cell identity with a number of unique length-6 QPSK-based sequences in the defined set.

29. The network node of claim 17, wherein the reference signal is transmitted on six subcarriers.

30. The network node of claim 17, wherein the reference signal is a demodulation reference signal.

31. The network node of claim 17, wherein the wireless communication system is a narrowband Internet of Things, NB-IoT, system.

32. The network node of claim 17, wherein the network node is a base station.

33. A method implemented by a user equipment for transmitting a reference signal in a wireless communication system, the method comprising:
   determining a length-6 phase coefficient sequence that is one of multiple unique length-6 phase coefficient sequences in a defined set, wherein the length-6 phase coefficient sequences in the defined set include at least: {1, 1, 1, 1, 3, −3} and {−3, 3, −3, 1, 1, −3}; or {−1, −1, −1, 3, −3, −1} and either {3, −3, 3, −1, 3, 3} or {1, 3, 1, −1, −1, 3}, wherein the defined set includes at least 14 unique length-6 phase coefficient sequences, wherein length-6 QPSK-based sequences formable from the length-6 phase coefficient sequences in the defined set have a normalized maximum pair-wise cross-correlation in the time domain less than or equal to 0.75, and wherein the normalized maximum pair-wise cross-correlation in the time domain is calculated such that the normalized maximum pair-wise cross-correlation of length-6 QPSK-based sequences in any defined set having more than 16 unique length-6 phase coefficient sequences is greater than 0.85;

generating a quadrature phase shift keying, QPSK-based sequence that comprises a sequence of QPSK symbols whose respective phases are based on the determined phase coefficient sequence;

generating a reference signal using the generated QPSK-based sequence; and transmitting the generated reference signal to a network node in the wireless communication system.

34. A method implemented by a network node in a wireless communication system, the method comprising:

determining a length-6 phase coefficient sequence that is one of multiple unique length-6 phase coefficient sequences in a defined set, wherein the length-6 phase coefficient sequences in the defined set include at least: $\{1, 1, 1, 1, 3, -3\}$ and $\{-3, 3, -3, 1, 1, -3\}$; or $\{-1, -1, -1, 3, -3, -1\}$ and either $\{3, -3, 3, -1, 3, 3\}$ OR $\{1, 3, 1, -1, -1, 3\}$, wherein the defined set includes at least 14 unique length-6 phase coefficient sequences, wherein length-6 QPSK-based sequences formable from the length-6 phase coefficient sequences in the defined set have a normalized maximum pair-wise cross-correlation in the time domain less than or equal to 0.75, and wherein the normalized maximum pair-wise cross-correlation in the time domain is calculated such that the normalized maximum pair-wise cross-correlation of length-6 QPSK-based sequences in any defined set having more than 16 unique length-6 phase coefficient sequences is greater than 0.85; and receiving, from a user equipment, a reference signal generated based on a quadrature phase shift keying, QPSK-based sequence that comprises a sequence of QPSK symbols whose respective phases are based on the determined phase coefficient sequence.

35. A non-transitory computer-readable storage medium having stored thereon a computer program that, when executed by a processor of a user equipment configured for use in a wireless communication system, causes the user equipment to:

determine a length-6 phase coefficient sequence that is one of multiple unique length-6 phase coefficient sequences in a defined set, wherein the length-6 phase coefficient sequences in the defined set include at least: $\{1, 1, 1, 1, 3, -3\}$ and $\{-3, 3, -3, 1, 1, -3\}$; or $\{-1, -1, -1, 3, -3, -1\}$ and either $\{3, -3, 3, -1, 3, 3\}$ or $\{1, 3, 1, -1, -1, 3$, wherein the defined set includes at least 14 unique length-6 phase coefficient sequences, wherein length-6 QPSK-based sequences formable from the length-6 phase coefficient sequences in the defined set have a normalized maximum pair-wise cross-correlation in the time domain less than or equal to 0.75, and wherein the normalized maximum pair-wise cross-correlation in the time domain is calculated such that the normalized maximum pair-wise cross-correlation of length-6 QPSK-based sequences in any defined set having more than 16 unique length-6 phase coefficient sequences is greater than 0.85;

generate a quadrature phase shift keying, QPSK-based sequence that comprises a sequence of QPSK symbols whose respective phases are based on the determined phase coefficient sequence;

generate a reference signal using the generated QPSK-based sequence; and transmit the generated reference signal to a network node in the wireless communication system.

36. A non-transitory computer-readable storage medium having stored thereon a computer program that, when executed by a processor of a network node configured for use in a wireless communication system, causes the network node to:

determine a length-6 phase coefficient sequence that is one of multiple unique length-6 phase coefficient sequences in a defined set, wherein the length-6 phase coefficient sequences in the defined set include at least: $\{1, 1, 1, 1, 3, -3\}$ and $\{-3, 3, -3, 1, 1, -3\}$; or $\{-1, -1, -1, 3, -3, -1\}$ and either $\{3, -3, 3, -1, 3, 3\}$ or $\{1, 3, 1, -1, -1, 3\}$, wherein the defined set includes at least 14 unique length-6 phase coefficient sequences, wherein length-6 QPSK-based sequences formable from the length-6 phase coefficient sequences in the defined set have a normalized maximum pair-wise cross-correlation in the time domain less than or equal to 0.75, and wherein the normalized maximum pair-wise cross-correlation in the time domain is calculated such that the normalized maximum pair-wise cross-correlation of length-6 QPSK-based sequences in any defined set having more than 16 unique length-6 phase coefficient sequences is greater than 0.85; and receive, from a user equipment, a reference signal generated based on a quadrature phase shift keying, QPSK-based sequence that comprises a sequence of QPSK symbols whose respective phases are based on the determined phase coefficient sequence.

* * * * *